United States Patent [19]
Porter et al.

[11] Patent Number: 5,889,945
[45] Date of Patent: *Mar. 30, 1999

[54] SYSTEM FOR DYNAMICALLY UPDATING INFORMATION IN PANELS WITHIN AN ATTENDEE BAR CORRESPONDING TO A CONFERENCE SESSION WHEN SELECTED INFORMATION REGARDING TO CONFERENCING PARTICIPANTS CHANGES

[75] Inventors: Daniel R. Porter; Frederick J. Cooper; Karen J. Rafnel, all of Portland; Anthony C. Salvador, Hillsboro; Rune A. Skarbo, Portland, all of Oreg.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 579,096

[22] Filed: Dec. 27, 1995

[51] Int. Cl.$^6$ .................................................... G06F 13/00
[52] U.S. Cl. ............................... 395/200.34; 395/200.35; 395/200.36
[58] Field of Search ....................... 379/202; 395/200.34, 395/200.35, 200.36

[56] References Cited

U.S. PATENT DOCUMENTS

| | | | |
|---|---|---|---|
| 5,008,853 | 4/1991 | Bly et al. ................................ | 395/331 |
| 5,546,449 | 8/1996 | Hogan et al. ............................ | 379/202 |
| 5,572,582 | 11/1996 | Riddle ..................................... | 379/202 |
| 5,581,702 | 12/1996 | McArdle et al. .................... | 395/200.34 |
| 5,583,993 | 12/1996 | Foster et al. ........................ | 395/200.35 |
| 5,617,539 | 4/1997 | Ludwig et al. ...................... | 395/200.35 |
| 5,619,555 | 4/1997 | Fenton et al. ......................... | 379/88.11 |

OTHER PUBLICATIONS

"PictureTel introduces new Windows 95 –based desktop developed videoconferencing product: New standards-–based PCS 200 jointly with Compaq", PictureTel Corporation News Release, 16 Oct. 1995, pp.1–4.

*Primary Examiner*—Le Hien Luu
*Attorney, Agent, or Firm*—Blakely, Sokoloff, Taylor & Zafman LLP

[57] ABSTRACT

A method and apparatus for associating user information with conference participants in a conferencing environment generates one or more attendee bars corresponding to the conferencing environment. Each attendee bar includes a plurality of panels corresponding to the conferencing participants, and each of the panels includes information regarding a conferencing participant. The attendee bar is then updated whenever the information regarding one of the plurality of conferencing participants changes.

19 Claims, 8 Drawing Sheets

SYSTEM FOR DYNAMICALLY UPDATING INFORMATION IN PANELS WITHIN AN ATTENDEE BAR CORRESPONDING TO A CONFERENCE SESSION WHEN SELECTED INFORMATION REGARDING TO CONFERENCING PARTICIPANTS CHANGES

BACKGROUND OF THE INVENTION

1. Field of the Invention

The present invention pertains to the field of data and video conferencing. More particularly, this invention relates to associating user information with conference participants during a data and/or video conference.

2. Background

Computer technology is continuously advancing, resulting in modern computer systems which provide ever-increasing performance. One result of this improved performance is an increased use of computer systems by individuals in a wide variety of business, academic and personal applications. One such use is that of data and/or video conferencing, where individuals in different locations can communicate with each other via their computer systems. Typically, data conferencing refers to individuals viewing documents, data, or similar information, and video conferencing refers to individuals viewing images (generally of one another). The different locations can span virtually any distance, such as between multiple offices in the same building or between multiple offices in different countries.

The benefits of data and/or video conferencing are numerous. Among these benefits is the ability of multiple individuals to effectively and quickly communicate information and ideas to one another over large distances. The information and ideas can be displayed by each computer system, and frequently verbal discussions can accompany the images. Data and video can both be transmitted in a conferencing environment.

However, one problem which exists in many current conferencing environments is the ability to provide each individual end user with specific information about the other conferencing participants. For example, the names of the other participants, current pages of documents being viewed by other participants, which application tools are being used by other participants, which other conference participants are sharing particular applications, etc. is all valuable information to conferencing participants. Thus, it would be beneficial to have a mechanism for maintaining and providing such valuable information to conferencing participants.

Additionally, in a conference having several conferencing participants, it is desirable to be able to associate specific controls or commands with individual participants. For example, one conferencing participant may want to send a private message to a second conferencing participant without all of the other participants seeing the message. By way of another example, a conferencing participant may want to transfer a file to one or more, but not to all, other conferencing participants. Thus, it would be beneficial to provide a mechanism for associating specific controls and/or commands with individual conferencing participants.

As will be described in more detail below, the present invention provides for a method and apparatus that achieves these and other desired results which will be apparent to those skilled in the art from the description to follow.

SUMMARY OF THE INVENTION

A method and apparatus for associating user information with conference participants in a conferencing environment is described herein. The method generates one or more attendee bars corresponding to the conferencing environment. Each attendee bar includes a plurality of panels corresponding to the conferencing participants, and each of the panels includes information regarding a conferencing participant. The attendee bar is then updated whenever the information regarding one of the plurality of conferencing participants changes.

According to one embodiment, the present invention provides information regarding other conference users and also allows different commands to be executed. These different commands can target one specific conference participant, even though several users may be participating in the conference. The information regarding other users and the different commands can be provided as, for example, either graphical indicators on a panel or as part of a menu.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention.

The present description includes material protected by copyrights, such as illustrations of graphical user interface images which the assignee of the present invention owns. The assignee hereby reserves its rights, including copyright, in these materials, and each such material should be regarded as bearing the following notice: Copyright Intel Corporation. The copyright owner has no objection to the facsimile reproduction by anyone of the patent document or the patent disclosure, as it appears in the Patent and Trademark Office patent file or records, but otherwise reserves all copyrights whatsoever.

The present invention provides a method and apparatus for associating user information with conference participants (also referred to as "attendees") in a conferencing environment. The user information is stored in an attendee bar database at each conferencing end point and is displayed at the end point via one or more attendee bars. Each conferencing application can include and modify its own attendee bar. The attendee bar(s) includes, for each of the conference participants which are sharing the corresponding application, a different panel which can include various graphical, textual, etc. indicators corresponding to the conferencing participant. User information corresponding to different participants, including application-specific information, and specific controls or commands can be associated with individual participants and made quickly and easily available to conferencing participants through the panels and indicators of the attendee bar.

Figure 1:
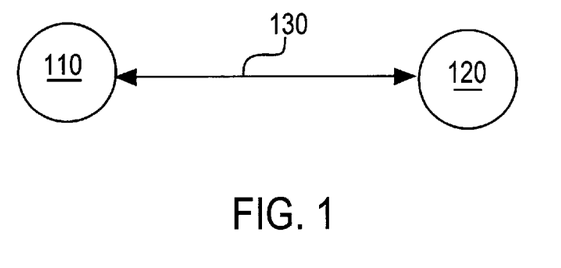
FIG. 1 shows a conferencing environment such as may be used with one embodiment of the present invention.

FIG. 1 shows a conferencing environment such as may be used with one embodiment of the present invention. Conferencing environment 100 includes two end points 110 and 120 coupled together by a communication link 130. In one implementation, each of the end points 110 and 120 are general personal computer systems. Alternatively, end points 110 and 120 could be dedicated conferencing systems.

Communication link 130 represents any of a wide variety of conventional communication media. For example, communication link 130 can be an Integrated Services Digital Network (ISDN) or Plain Old Telephone Service (POTS) line, Ethernet cable, a fiber optic line, portions of the Internet, etc. Additionally, communication link 130 can be a wireless communication medium, such as signals propagating in the infrared or radio frequencies. Furthermore, communication link 130 can be a combination of communication media and can include converting devices for changing the form of the signal based on the communication media being used.

Figure 2:
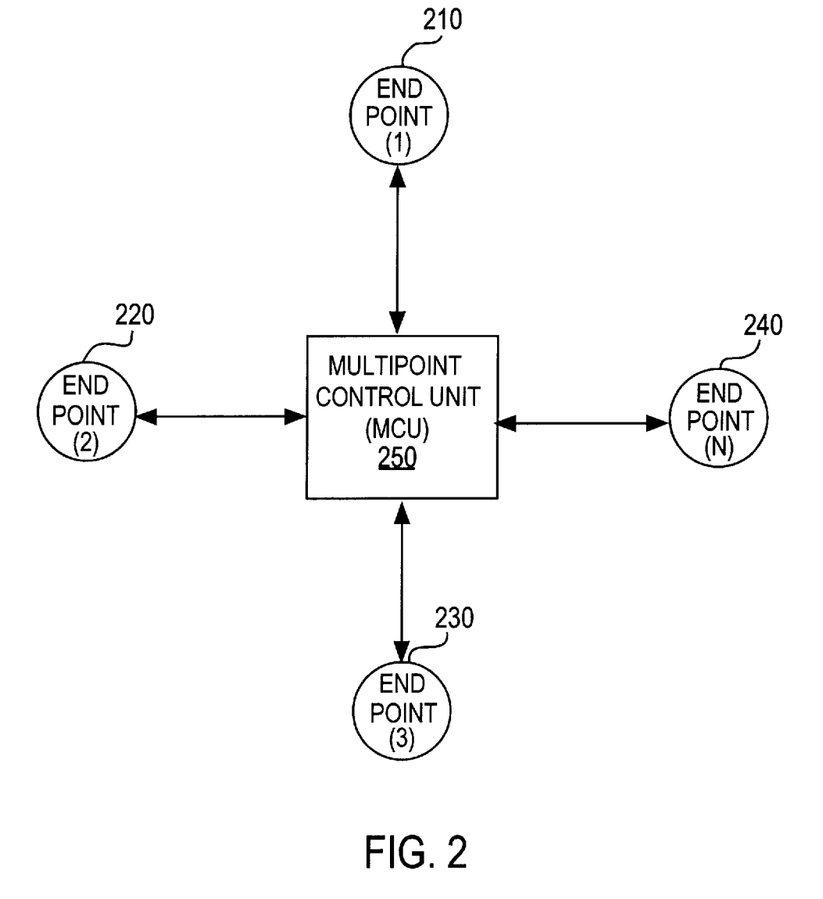
FIG. 2 shows a conferencing environment such as may be used with another embodiment of the present invention.

FIG. 2 shows a conferencing environment such as may be used with another embodiment of the present invention. Conferencing environment 200 includes multiple (N) end points: end point 210, end point 220, end point 230, and end point 240. Each of the end points 210–240 are coupled together via a multipoint control unit (MCU) 250. MCU 250 is a switching device which transfers inputs received from each end point to the other end points. MCU 250 is coupled to each end point via a communication link, as shown in FIG. 2. Each communication link can be any of a wide variety of conventional communication media, analogous to communication link 130 of FIG. 1 discussed above.

Each end point 210–240, as well as end points 110 and 120 of FIG. 1, is coupled to a video camera. The video cameras provide a visual representation of the user of the end point, thereby allowing each conference participant to see the other participants, even though they may be separated by great distances. In one embodiment, these video cameras are ProShare™ video cameras, available from Intel Corporation of Santa Clara, Calif.

In one embodiment of the present invention, MCU 250 is a dedicated switching device. Alternatively, MCU 250 can be implemented in software, such as on a computer system coupled to a local area network (LAN). It is to be appreciated that any of a wide variety of conventional multipoint control units can be used with the present invention.

It should be noted that in some embodiments of the present invention MCU 250 is not necessary in multipoint conferences. In these embodiments, each end point receives all of the conferencing information and performs the switching function of MCU 250.

Applications can be shared between multiple systems in the conferencing environment by having the application execute on only a single system. This is typically referred to as "application sharing". The system which executes the application is referred to as the host system. The host system transfers the necessary information from the host system to one or more end points to allow the end point(s) to display the application and appear to the users of the end point(s) as if the application were actually executing at their end point(s).

Additionally, applications can also be shared between multiple systems in the conferencing environment where the application is executing at all of the end points. When an application is executing at multiple end points, each participant can make changes to the application data at his or her end point (subject to any turn-taking controls which may be in place). The end point then sends a message to all of the other end points indicating the changes which were made by the participant. The other end points receive these messages and provide the changes as inputs to the application they are executing.

The conferencing environments which can be used with the present invention support both data conferences and audio/video conferences. A data conference is a conference where one or more documents or similar information are displayed to each participant (e.g., application sharing or the ProShare™ notebook). An audio/video conference is a conference where one or more visual images (e.g., images of conference participants) are displayed to each participant along with audio signals from the participants. The present invention also supports data and audio/video conferences concurrently, such as by displaying a conference participant, a document(s), and providing the participant's voice simultaneously. The conference data of a conference refers to the data or information being provided to the conference participants, such as a shared application information, video images or audio signals.

Figure 3:
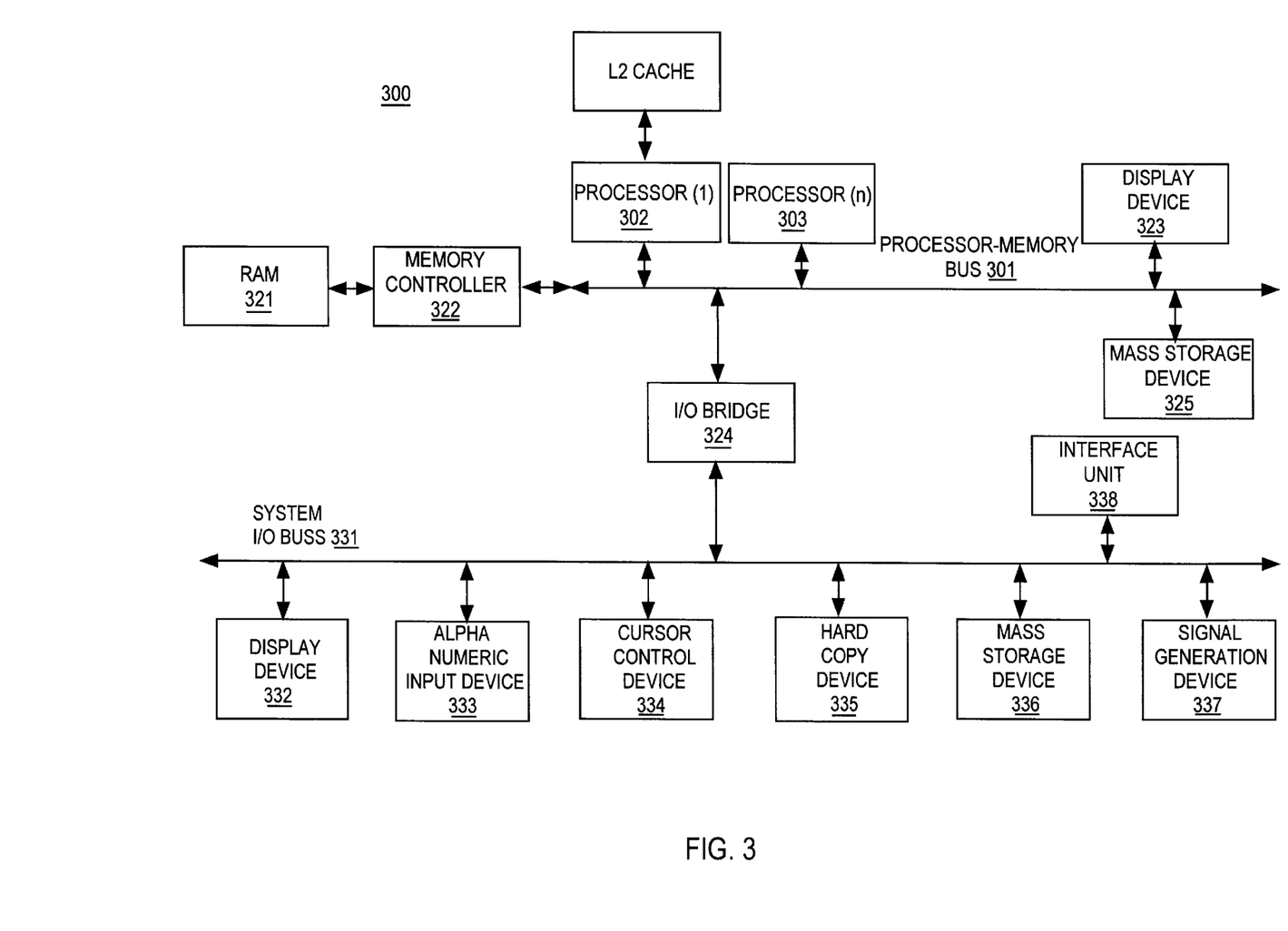
FIG. 3 shows an overview of a computer system which can be used in a conferencing environment according to one embodiment of the present invention.

FIG. 3 shows an overview of a computer system which can be used in a conferencing environment according to one embodiment of the present invention. In one embodiment, end points 110 and 120 of FIG. 1 are each a computer system 300 of FIG. 3. In another embodiment, each of the end points coupled to MCU 250 of FIG. 2 is a computer system 300 of FIG. 3.

The computer system 300 generally comprises a processor-memory bus or other communication means 301 for communicating information between one or more processors 302 and 303. Processor-memory bus 301 includes address, data and control buses and is coupled to multiple devices or agents. Processors 302 and 303 may include a small, extremely fast internal cache memory (not shown), commonly referred to as a level one (L1) cache memory for temporarily storing data and instructions on-chip. In addition, a bigger, slower level two (L2) cache memory 304 can be coupled to processor 302 or processor 303 for temporarily storing data and instructions for use by the processor. In one embodiment, processors 302 and 303 are Intel® Architecture compatible microprocessors, such as i386™, i486™, Pentium™ or Pentium Pro™ processors. However, the present invention may utilize any type of microprocessor, including different types of processors.

Also coupled to processor-memory bus 301 is processor 303 for processing information in conjunction with processor 302. Processor 303 may comprise a parallel processor, such as a processor similar to or the same as processor 302. Alternatively, processor 303 may comprise a co-processor, such as a digital signal processor. The processor-memory bus 301 provides system access to the memory and input/ output (I/O) subsystems. A memory controller 322 is coupled with processor-memory bus 301 for controlling access to a random access memory (RAM) or other dynamic storage device 321 (commonly referred to as a main memory) for storing information and instructions for processor 302 and processor 303. A mass data storage device 325, such as a magnetic disk and disk drive, for storing information and instructions, and a display device 323, such as a cathode ray tube (CRT), liquid crystal display (LCD), etc., for displaying information to the computer user are coupled to processor-memory bus 301.

An input/output (I/O) bridge 324 is coupled to processor-memory bus 301 and system I/O bus 331 to provide a communication path or gateway for devices on either processor-memory bus 301 or I/O bus 331 to access or transfer data between devices on the other bus. Essentially, bridge 324 is an interface between the system I/O bus 331 and the processor-memory bus 301.

System I/O bus 331 communicates information between peripheral devices in the computer system. In one embodiment, system I/O bus 331 is a Peripheral Component Interconnect (PCI) bus. Devices that may be coupled to system I/O bus 331 include a display device 332, such as a cathode ray tube, liquid crystal display, etc., an alphanumeric input device 333 including alphanumeric and other keys, etc., for communicating information and command selections to other devices in the computer system (for example, processor 302) and a cursor control device 334 for controlling cursor or pointer movement. Moreover, a hard copy device 335, such as a plotter or printer, for providing a visual representation of the computer images and a mass storage device 336, such as a magnetic disk and disk drive, for storing information and instructions, and a signal generation device 337 may also be coupled to system I/O bus 331.

In one embodiment of the present invention, signal generation device 337 includes, as an input device, a standard microphone to input audio or voice data to be processed by the computer system. The signal generation device 337 also includes an analog to digital converter to transform analog audio data to digital form which can be processed by the computer system. The signal generation device 337 also includes, as an output, a standard speaker for realizing the output audio from input signals from the computer system. Signal generation device 337 also includes well known audio processing hardware to transform digital audio data to audio signals for output to the speaker, thus creating an audible output.

In one embodiment of the present invention, signal generation device 337 also includes, as an input device, a ProShare™ video camera to input video images to be processed by the computer system. The video camera is coupled to an analog to digital converter to transfer analog video data to digital form which can be processed by the computer system.

An interface unit 338 is also coupled with system I/O bus 331. Interface unit 338 allows system 300 to communicate with other computer systems by sending and receiving the video, audio and data signals for the conference, as well as the necessary control signals based on the communication medium being used. In one embodiment, interface 338 is a conventional ISDN adapter which provides communication between the system 300 and an ISDN line. Alternatively, interface unit 338 could be a modem, a conventional network adapter such as an Ethernet LAN adapter, or any of a wide variety of other communication devices.

The display device 332 used with the computer system and the present invention may be a liquid crystal device, cathode ray tube, or other display device suitable for creating graphic images and alphanumeric characters (and ideographic character sets) recognizable to the user. The cursor control device 334 allows the computer user to dynamically signal the two dimensional movement of a visible symbol (pointer) on a display screen of the display device 332. Many implementations of the cursor control device are known in the art including a trackball, trackpad, mouse, joystick or special keys on the alphanumeric input device 333 capable of signaling movement of a given direction or manner of displacement. It is to be appreciated that the cursor also may be directed and/or activated via input from the keyboard using special keys and key sequence commands. Alternatively, the cursor may be directed and/or activated via input from a number of specially adapted cursor directing devices, including those uniquely developed for the disabled.

In one embodiment of the present invention, system 300 executes the Microsoft Windows™ operating system. It is to be appreciated, however, that system 300 represents any of a wide variety of conventional computer systems that can execute any of a wide variety of operating systems.

Certain implementations of the present invention may include additional processors or other components. Additionally, certain implementations of the present invention may not require nor include all of the above components. For example, display device 323 or mass storage device 325 may not be coupled to processor-memory bus 301, or system 300 may contain only a single processor (e.g., only processor 302). Furthermore, the peripheral devices shown coupled to system I/O bus 331 may be coupled to processor-memory bus 301; in addition, in some implementations only a single bus may exist with the processors 302 and 303, memory controller 322, and peripheral devices 332 through 339 coupled to the single bus.

Figure 4:
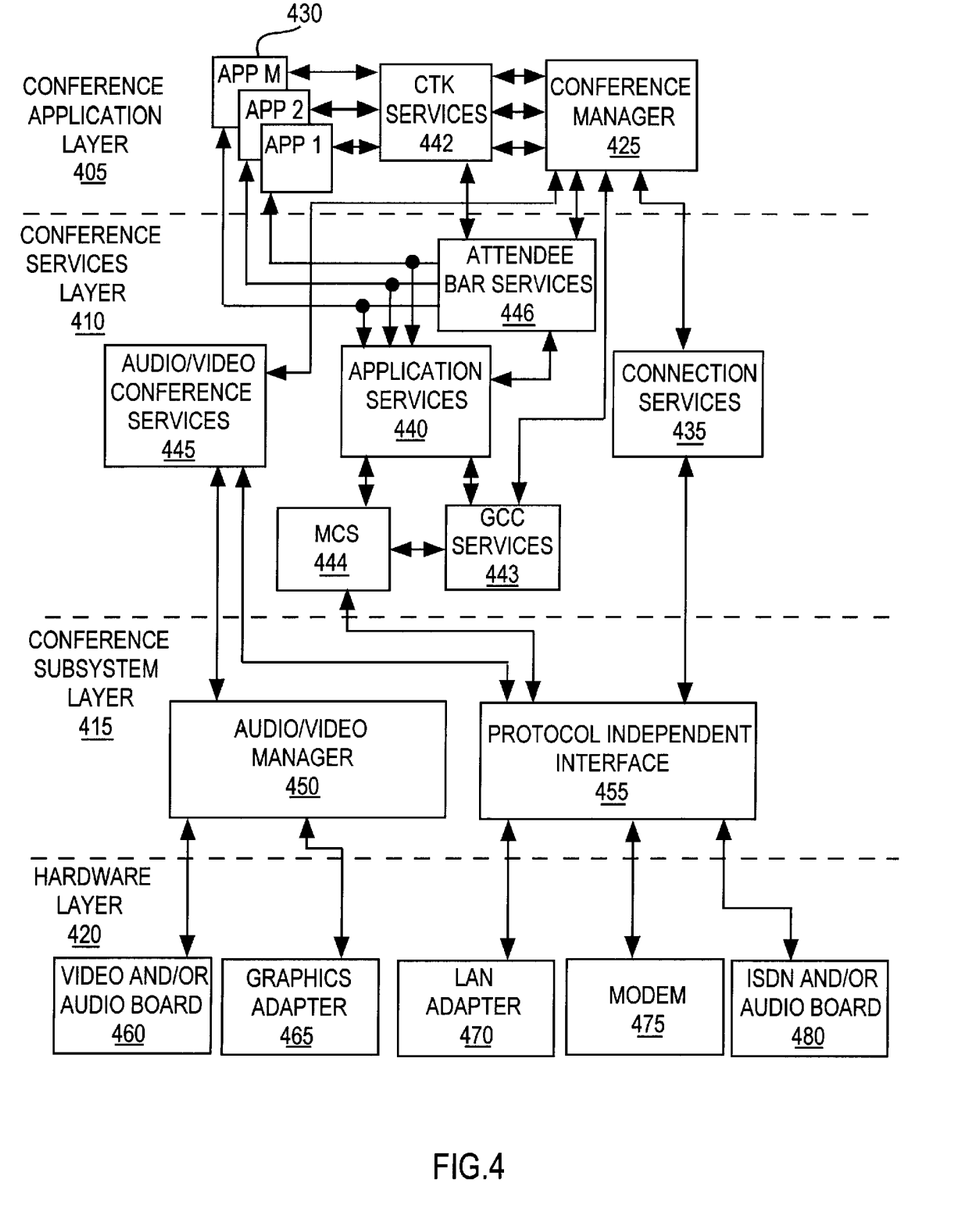
FIG. 4 is a block diagram showing an architectural overview of conferencing on an end point according to one embodiment of the present invention.

FIG. 4 is a block diagram showing an architectural overview of conferencing on an end point according to one embodiment of the present invention. As shown in FIG. 4, the conferencing architecture is separated into multiple layers. These layers are conference application layer 405, conference service layer 410, conference subsystem layer 415, and hardware layer 420.

Conference application layer 405 includes conference manager 425, multiple applications 430, and connection toolkit (CTK) services 442. Conference manager 425 provides a conferencing interface to the user of the end point. In one embodiment, the conferencing interface is a graphical user interface (GUI). In one implementation, conference manager 425 includes options, such as through a menu, which allows the end point user to add or delete applications to the conference.

Applications 430 represent any of a wide variety of conventional software applications. In one embodiment of the present invention, one of the applications 430 is a notebook application which is provided by the ProShare™ conferencing system. The notebook application allows the end point users to input text and/or drawings for the conference. In one implementation, additional applications are, for example, application sharing software, a high-quality image sharing application(s), or a file transfer application(s). It is to be appreciated that any number of applications can be executed at an end point.

CTK services 442 provides an interface which allows messages to be transferred between applications 430 and conference manager 425. CTK services 442 also provides an interface which allows messages to be transferred between attendee bar services 446 and conference manager 425.

Conference application layer 405 is coupled to conference service layer 410. Conference service layer 410 includes connection services 435, application services 440, generic conference control (GCC) services 443, multipoint communication services (MCS) 444, audio/video conference services 445, and attendee bar services 446. Connection services 435 establishes and maintains connections with the other end point(s), via the MCU if necessary. Connection services 435 interfaces between the conference subsystem layer 415 and conference manager 425 when establishing connections which are initiated by either this end point or another end point. In one embodiment, connection services 435 also includes address book services which provide services related to managing connection addresses for conference participants.

Application services 440 provides an interface between applications 430 and conference subsystem layer 415. Application services 440 also provides an interface between applications 430, and GCC services 443 and MCS 444. In one implementation, application services 440 also prevents one application from unfairly dominating the communication services of lower layers.

GCC services 443 maintains a record of the applications 430 which are executing on the end point and provides registry services to allow applications 430 to register with GCC services 443. In addition, GCC services 443 also maintains a record of current conference participants.

MCS 444 provides support for full-duplex multipoint communication among an arbitrary number of connected application entities over a variety of conventional networks. In one implementation, MCS 444 provides multipoint message routing and message broadcasting. The multipoint message routing ensures that the other end points all receive messages from this system in the same order, and identifies the shortest path to each of the other end points. Message broadcasting allows connection information to be broadcast to all end points in the conference.

Audio/Video conferencing services 445 provides an interface between conference subsystem layer 415 and conference manager 425. Audio/Video services 445 provide audio and video services to conference application layer 405, such as capture and playback services for video streams.

Attendee bar services 446 provides support for the associating of user information with conference participants of the present invention. In one embodiment, attendee bar services 446 is a library of function calls which are available to the applications executing at an end point, as discussed in more detail below.

Conference subsystem layer 415 operates in a conventional manner to provide an interface between the protocol-independent conference service layer 410 and the specific protocols of the devices in hardware layer 420. Audio/video manager 450 provides an interface which receives audio and video data from audio/video conference services 445 and outputs it to the hardware layer 420 for display or audio play.

Protocol independent interface 455 provides an interface between the components of conference service layer 410 and hardware layer 420. Interface 455 receives data and messages from the components of conference service layer 410 and converts the information received to the proper format based on the hardware connected to the system.

Hardware layer 420 includes video and/or audio board 460 and graphics adapter 465. The board 460 and adapter 465 are conventional computer system boards for realizing video and/or audio outputs. For example, the video outputs may be realized on a display device and the audio outputs may be realized via a computer system speaker. The board 460 and adapter 465 also provide sampling, digitization, compression/decompression of audio signals exchanged between two end points over a full-duplex audio connection, as well as interfacing with the proper CODEC to compress and decompress the video signals.

Hardware layer 420 also includes a LAN adapter 470, modem 475, and ISDN and/or audio board 480. LAN adapter 470 is a conventional LAN adapter, such as an Ethernet adapter. Modem 475 is a conventional line for coupling the end point to a POTS line. ISDN and/or audio board 480 is a conventional ISDN line which can also include audio support.

It is to be appreciated that, depending on the conferencing environment, all of the components of hardware layer 420 may not be included. For example, LAN adapter 470 may not be included in one of the end points.

The present invention provides one or more attendee bars, each of which is separated into one or more panels. The attendee bar is an area of the display device at an end point where the panels are displayed to the user of the end point. The panels can be arranged in any of a wide variety of manners. In one embodiment, each of the conference participants corresponds to a different one of the panels.

In one embodiment of the present invention, each application being shared in a conference can include an attendee bar. In this embodiment, some identical information may be displayed in multiple attendee bars. For example, a conference participant's picture, name and address may be provided by each of multiple attendee bars. In an alternate embodiment, a single attendee bar is maintained for all applications in a conference (this single attendee bar could be generated by, for example, the conference manager application).

Information regarding a particular conferencing participant can be retrieved by activating the panel corresponding to the conferencing participant. A panel can be activated in any of a wide variety of conventional manners, such as by moving a cursor over the panel and "clicking" on a mouse button.

The user information regarding conference participants maintained by the present invention can be of any type which might be of interest to conference participants. This could include, for example, the participant's address, type of computer being used (e.g., laptop or desktop), which page of a particular application the participant is viewing, which tools the participant is viewing, etc. The information can be provided in any of a wide variety of manners, such as static text or bit maps. Additionally, other commands may be provided for selection corresponding to the conferencing participant. For example, a pull-down menu may be provided which allows a user to execute a program at both the user's end point and the selected conference participant's end point, such as a file transfer program, a chat program, etc.

An attendee bar according to the present invention can include generic information as well as application-specific information. Generic information refers to information which is not specific to a particular application, such as the conference participant's address or voice telephone number. Application-specific information refers to information which is specific to a particular application, such as the current page being viewed by the conferencing participant.

In one embodiment, the present invention is implemented in a conferencing end point having an architecture as shown in FIG. 4. When an application is executed which is to be part of the conference, the application registers with GCC services 443 and application services 440. The one or more attendee bars are associated with an attendee bar database. The attendee bar database is maintained in a nonvolatile storage device (such as mass storage device 325 of FIG. 3) and is copied into system memory (such as RAM 321 of FIG. 3) when needed. Conferencing applications can display an attendee bar by registering with the attendee bar database. Additionally, the applications 430 of each end point provide various information to the attendee bar services 446 at that end point regarding the user of that end point (this information is obtained by applications 430 from GCC services 443).

In one embodiment, information regarding changes in the conferencing participants, such as new participants joining in or participants leaving the conference, is received by an end point and input to GCC services 443. The information is then provided to applications 430 via application services 440. The individual applications 430 can then access attendee bar services 446 to add (or delete) a panel corresponding to the new (or departed) participant in the attendee bar.

In one embodiment of the present invention, conference manager 425 maintains a graphic image (e.g., a bit map) of the user of the end point. This graphic image can be a snapshot taken and stored at the end point for use during each conference or, alternatively, could be a single frame image taken at the beginning of the conference. This graphic image can then be accessed by attendee bar services 446 for display in a panel of the attendee bar.

Figure 5:
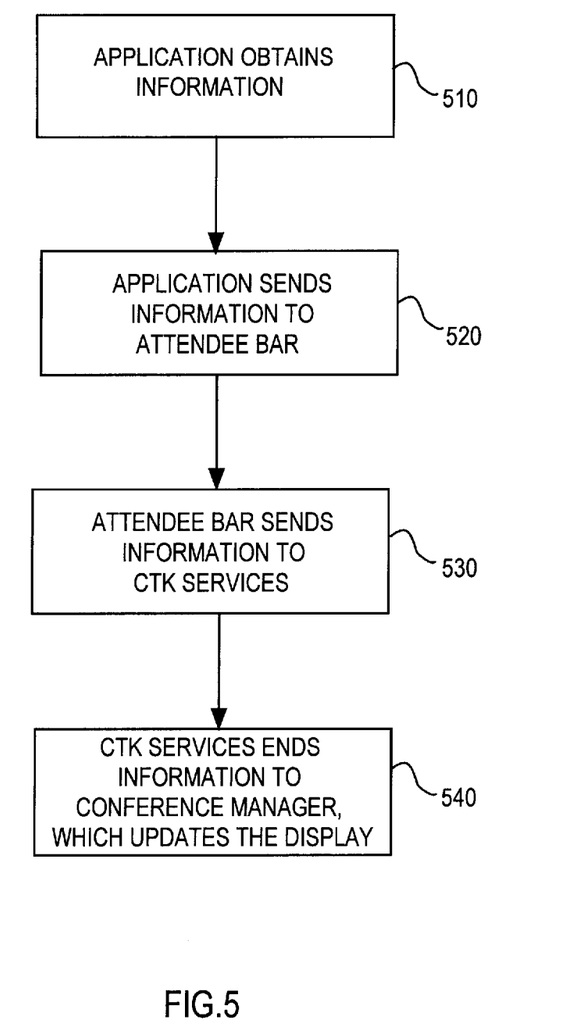
FIG. 5 is a flowchart showing the updating of an attendee bar according to one embodiment of the present invention.

FIG. 5 is a flowchart showing the updating of an attendee bar according to one embodiment of the present invention. The information which can be displayed in an attendee bar is controlled by the application 430 to which the attendee bar corresponds. This information is first obtained by the application, step 510. It should be noted that this information can be obtained by application 430 in a wide variety of manners. For example, information which is specific to this application and the user of this end point (e.g., the page the user at this end point is currently on) is inherently known by this application. By way of another example, information regarding the page being displayed by another end point is provided to the application from a message received by that other end point via application services 440.

The application 430 then sends a message(s) to attendee bar services 446 containing the information to be included in the attendee bar, step 520. These messages are sent when the attendee bar is generated, as well as when the application makes any changes to the attendee bar. It should be noted that whether information is sent to attendee bar services 446 is under the control of the application 430; new information which the application 430 does not wish to be displayed on the attendee bar is not provided to attendee bar services.

The attendee bar then sends the information to CTK services 442, step 530. CTK services 442 then provides the information to conference manager 425, which updates the display, step 540.

Thus, the individual applications 430 have control over what information is included in their corresponding attendee bars. The information provided in an attendee bar is that information which is sent to attendee bar services 446 from the individual applications 430. Thus, for example, a particular application 430 can decide whether to display panels for those conferencing participants which are not currently sharing the application 430, and can also decide how the attendee bar should be displayed by conference manager 425 on the end point.

FIGS. 6a–6f illustrate different examples of attendee bars of the present invention. Several of the examples below discuss the identifier of a conference participant. This identifier can be, for example, the name of the conference participant, or, by way of another example, the name of the end point location corresponding to that conference participant.

Figure 6A:
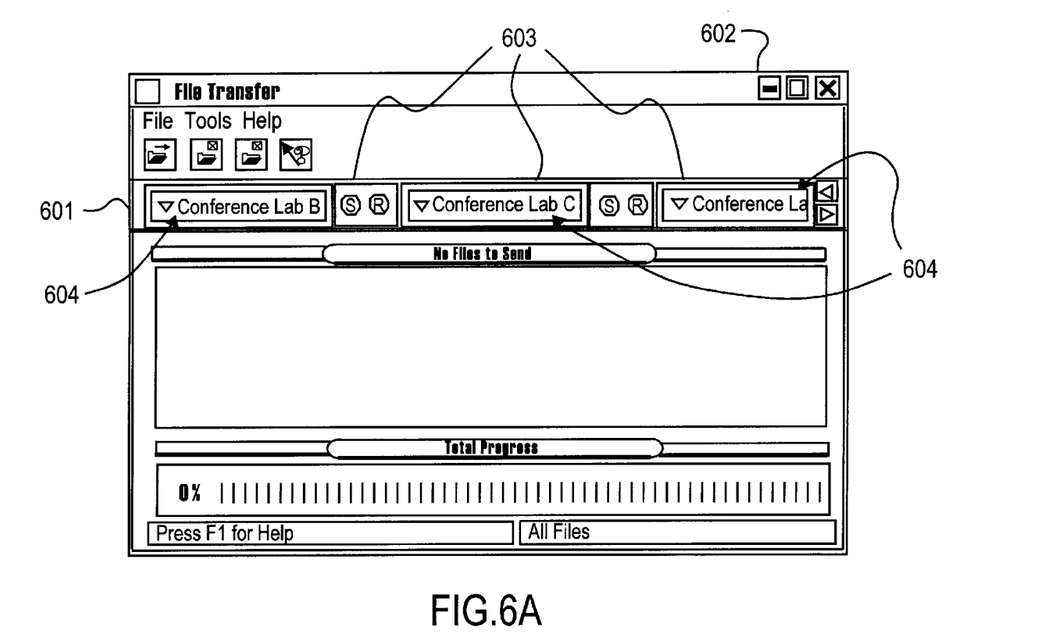
FIGS. 6a–6f illustrate examples of attendee bars according to different embodiments of the present invention.

FIG. 6a shows an attendee bar 601 within a file transfer parent window 602. The attendee bar 601 includes multiple panels 603 arranged in a horizontal format. In the example of FIG. 6a, each panel 603 displays an identifier 604 of one conference participant.

Figure 6B:
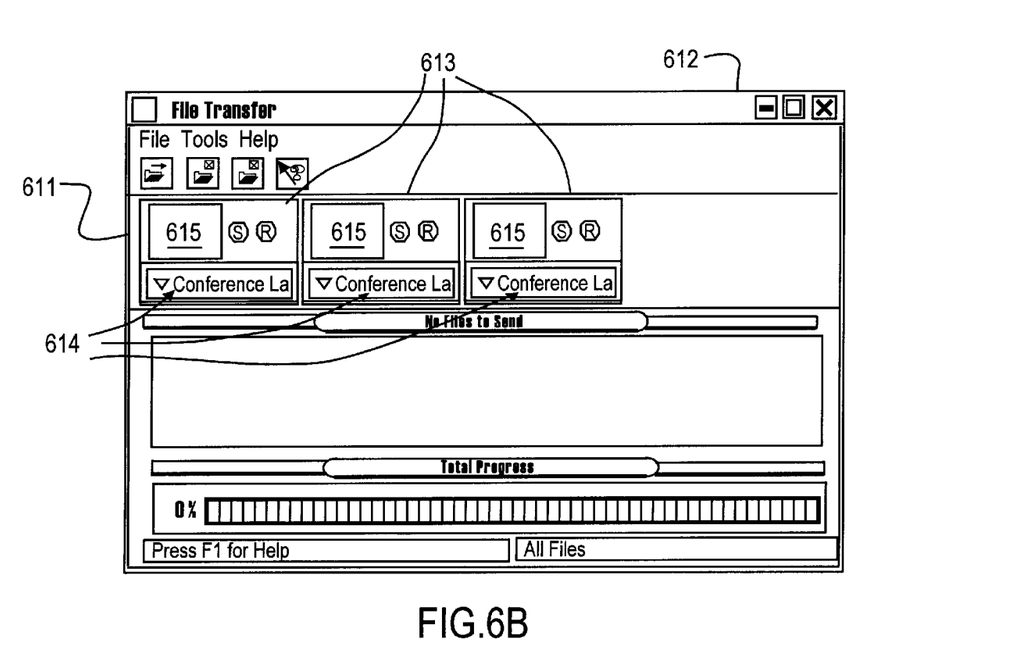

FIG. 6b shows an attendee bar 611 within a file transfer parent window 612. The attendee bar 611 includes multiple panels 613 arranged in a horizontal format. In the example of FIG. 6b, each panel 613 displays an identifier 614 of one conference participant and a bit map image 615 of the conference participant.

Figure 6C:
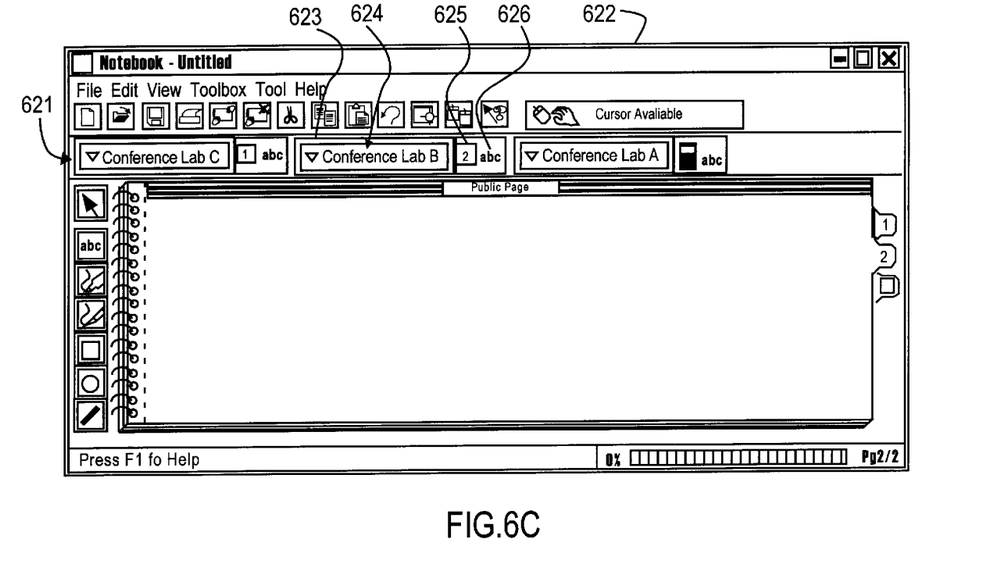

FIG. 6c shows an attendee bar 621 within a ProShare™ notebook parent window 622. The attendee bar 621 includes multiple panels 623 arranged in a horizontal format. In the example of FIG. 6c, each panel 623 displays an identifier 624 of one conference participant, an indicator 625 of the page the corresponding conference participant is currently viewing, if any, and an indicator 626 of the current tool selected by the corresponding conference participant.

Figure 6D:
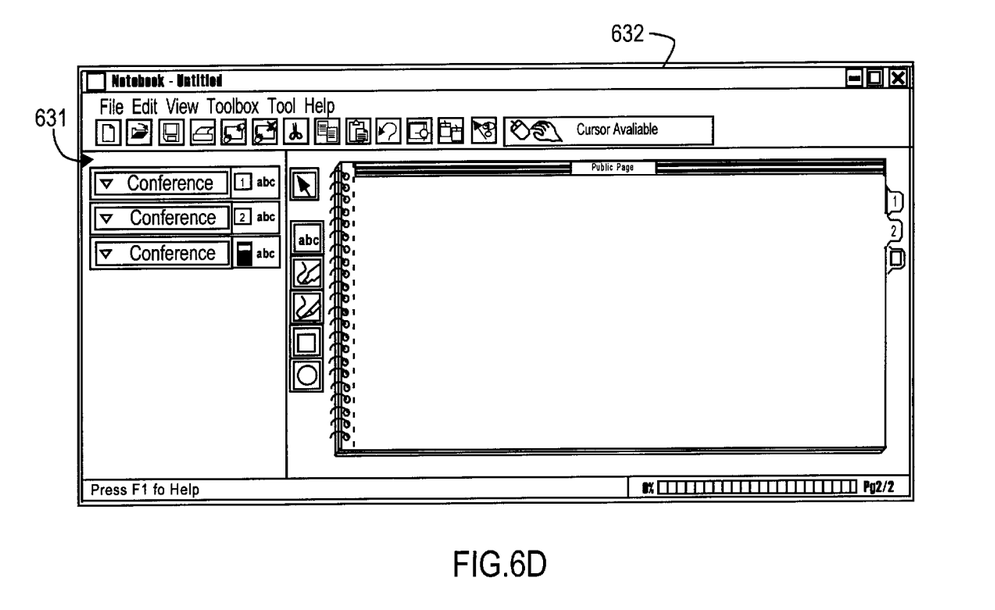

FIG. 6d shows an attendee bar 631 within a ProShare™ notebook parent window 632. The attendee bar 631 provides the same information as attendee bar 621 of FIG. 6c, except the attendee bar is arranged in a vertical format rather than a horizontal format.

Figure 6E:
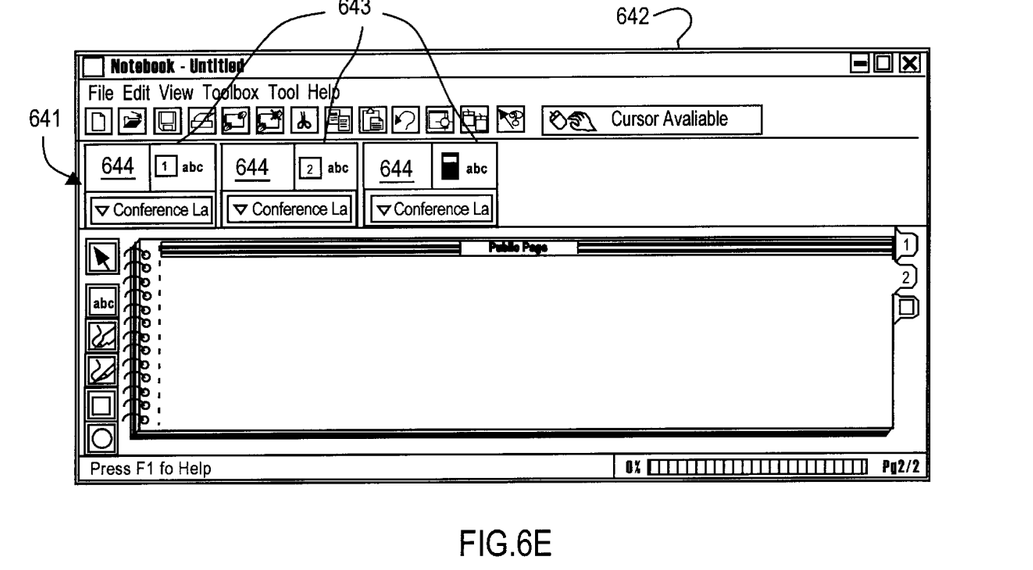

FIG. 6e shows an attendee bar 641 within a ProShare™ notebook parent window 642. The attendee bar 641 includes multiple panels 643 arranged in a horizontal format. The attendee bar 641 provides the same information as attendee bar 621 of FIG. 6c. Additionally, the attendee bar 641 also provides a bit map image 644 of the conference participant.

Figure 6F:
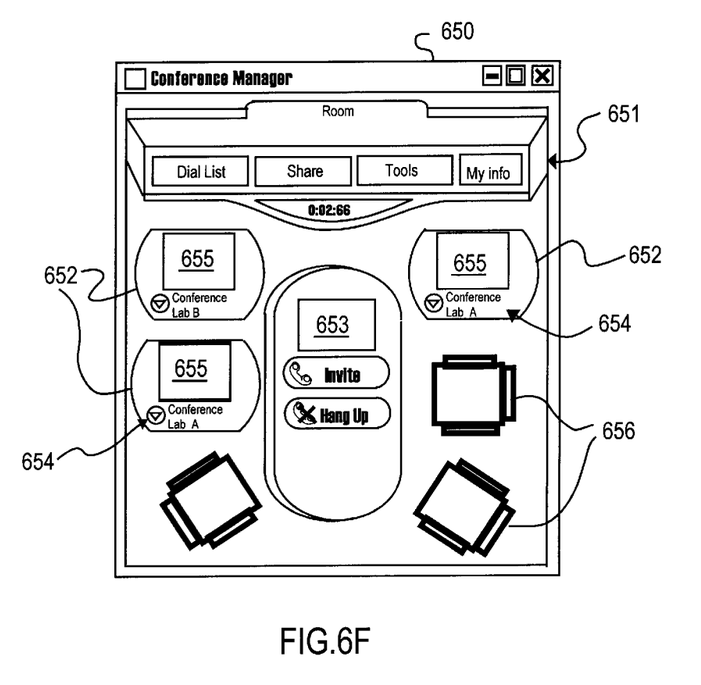

FIG. 6f shows a window 650 including an attendee bar 651 having multiple panels 652 arranged graphically around a picture of a conference table 653. In the example of FIG. 6f, each panel 652 displays an identifier 654 of one conference participant. Additionally, each panel 652 also displays a bit map image 655 of the conference participant. Empty chairs 656 are also shown to represent locations where new conference participants can be added. Thus, the arrangement of attendee bar 651 provides conference participants with a better feel of all participants being located in the same room.

Each panel of an attendee bar can include multiple menus and/or indicators. Indicators include, for example, buttons, bit maps, and static text corresponding to the panel. A button could be used, for example, to add the conference participant associated with the panel to application sharing. A bit map could be used, for example, to provide a graphical image of a command which can be selected. Static text could be used, for example, to indicate textual information regarding the conference participant associated with the panel, such as address, computer type, or current page for the application document. The application receives messages from other end points of the current page displayed on those other end points via application services 440. Thus, the application itself can update the text when necessary to indicate the current page displayed on the other end point(s).

In one embodiment, the indicators of a panel can be of four different types. These four types are: static, button, togglebutton, or number. In addition, the indicators can have up to four different possible states. These states are: hidden, disabled, enabled, and depressed. The static indicator is static text which cannot change states. The button indicator is a button that may be pressed and released. The togglebutton is a button that when pressed remains depressed until the button is pressed again. The number indicator is used to display a particular number (in an alternate embodiment, the display of a number is done using the static type). The hidden state holds a space for the indicator, but the indicator is not shown. The disabled state shows the indicator in a different format to indicate it is disabled (e.g., grayed out). The enabled state shows the indicator as active. The depressed state shows a button in a pressed state.

Each panel can also include one or more menus. In one embodiment, selection of the panel (e.g., clicking on the panel) displays the attendee bar menu. Thus, indicators can be displayed on the face of the panel, and the attendee bar menu is provided when the panel is selected. In an alternate embodiment, the panel is a bit map showing only the image of the participant (or perhaps image and name). Selection of the panel in this embodiment displays both the indicator(s) and the menu(s).

In one embodiment, information in the attendee bar database which is shared by all of the conferencing applications is displayed in the menu. This includes, for example, menu items to execute a file transfer program, to execute a chat program, or to synchronize another end point to view a particular location of the application. Additional menu items may also be added to a menu by applications coupled to the attendee bar services 446.

In one embodiment, selection of a particular menu item or indicator is handled by attendee bar services 446. For example, beginning execution of a chat program corresponding to another conference participant could be selected through either an indicator button or a menu item. Regardless of the form of the selection, attendee bar services 446 receives the input and determines what selection was made. Attendee bar services 446 then sends a message to CTK services 442 to execute the application identified by the selection. Whether a corresponding application is also executed on another end point is dependent on the specific application. For example, if a file transfer application is selected, then the application operates in a conventional manner to execute the file transfer program on both this end point and the targeted end point (the end point corresponding to the panel which was selected).

Applications can also add additional commands to panels of the attendee bar. These can be added as, for example, indicator buttons or menu items. For these additional commands, attendee bar services 446 receives the input and determines what selection was made. Attendee bar services 446 then sends a message to the application corresponding to the attendee bar identifying the command which was selected. The individual application is then responsible for carrying out the selected command.

In one embodiment, different view flags can be associated with an attendee bar. The view flags supported by one embodiment of the present invention are shown below in Table I. In one embodiment of the present invention, an attendee bar can include multiple flags from Table I.

TABLE 1

| View Flag | Description |
| --- | --- |
| SingleLine | Indicators are displayed next to the attendee's name. |
| DoubleLine | Indicators are displayed below the attendee's name |
| Top | Places the attendee bar at the top of the application window. |
| Bottom | Places the attendee bar at the bottom of the application window. |
| Left | Places the attendee bar to the left of the application window. |
| Right | Places the attendee bar to the right of the application window. |
| IndRight | Places indicators to the right of the attendee's name. |
| IndLeft | Places indicators to the left of the attendee's name. |
| Gallery | Displays a bit map of the conference participant above the attendee's name in each panel. |

In one embodiment of the present invention the number of rows (for horizontal-oriented attendee bars) or columns (for vertically-oriented attendee bars) of panels which are to be displayed at a time is limited. For example, only a single row or column of panels may be displayed at a time. If more panels are in the attendee bar than can be displayed in this limited number of rows or columns, then scroll bars are added to allow the participant at the end point to scroll horizontally (or vertically) in order to see all the other participants. In an alternate embodiment, the attendee bar displays all conferencing participants without the use of scroll bars. In this alternate embodiment, if additional participants join the conference and there is no room in the attendee bar for their corresponding panels, then the attendee bar is re-sized to in order to make room.

Figure 7:
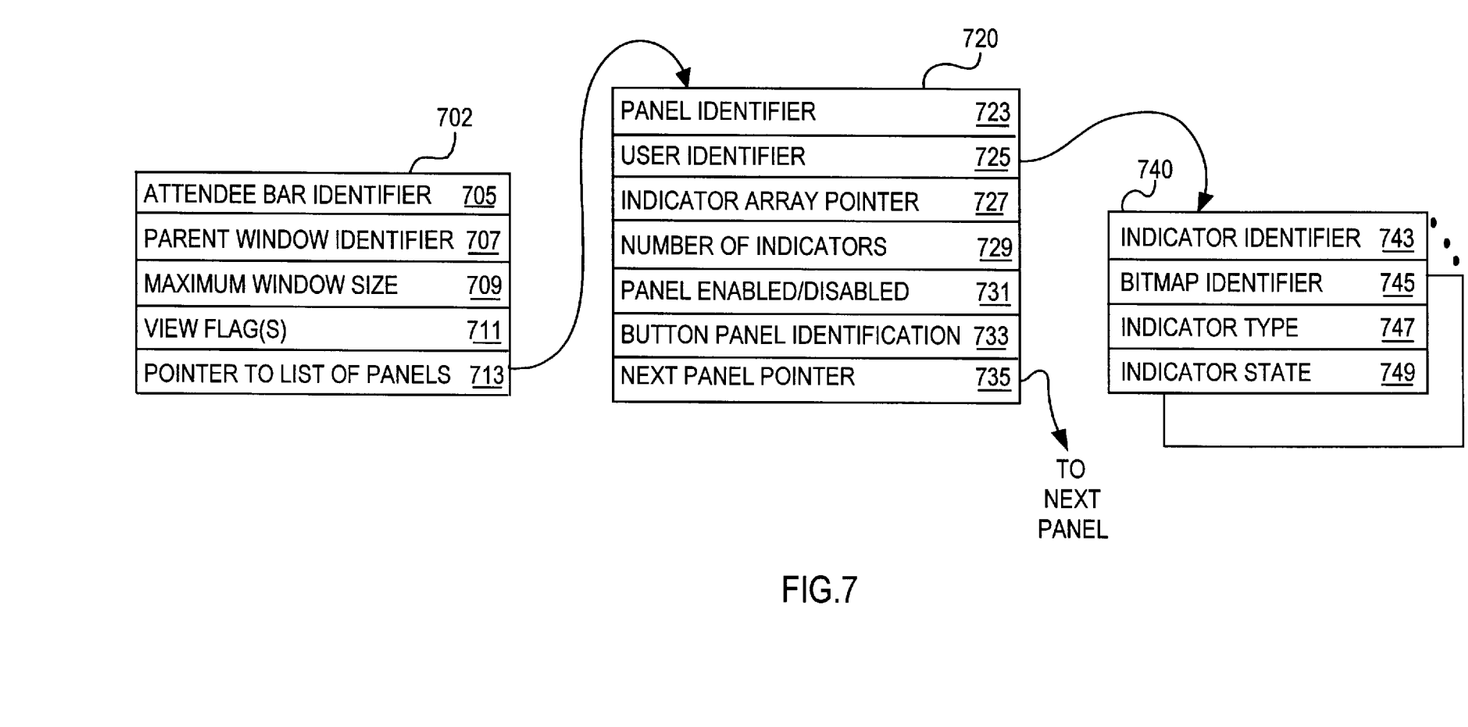
FIG. 7 is a block diagram showing an example attendee bar record stored in an attendee bar database according to one embodiment of the present invention.

FIG. 7 is a block diagram showing an example attendee bar record stored in an attendee bar database according to one embodiment of the present invention. In the example of FIG. 7, a single attendee bar record is shown having one panel and one indicator. However, it is to be appreciated that the present invention can include multiple attendee bars, each of which can include multiple panels and multiple indicators.

FIG. 7 shows an attendee bar record 702 including an attendee bar identifier 705, a parent window identifier 707, a maximum window size 709, view flag(s) 711, and a pointer to a list of panels 713. Attendee bar identifier 705 is a unique identifier for the attendee bar. Parent window identifier 707 is an identifier of the parent window for the attendee bar. The parent window is the window of the application which created the attendee bar. Maximum window size 709 indicates the maximum size that the attendee bar can be on the display. In one embodiment, this maximum size is the size of the unused area of the parent window (e.g., the size of the parent window less space used by borders, menus, captions, toolbars, etc.).

View flag(s) 711 identify which view flags, if any, are set for the attendee bar. The view flags according to one embodiment of the present invention are described above in Table I. The panel list pointer 713 is a pointer to a list of panels which are associated with this attendee bar. In one embodiment, the attendee bar includes one panel corresponding to each of the conferencing participants including the conferencing participant at this end point.

The panel list pointer 713 points to a list of panel records associated with the attendee bar record 702. One such panel record is shown as panel record 720. Panel record 720 includes a panel identifier 723, a user identifier 725, an indicator array pointer 727, a number of indicators 729, a panel enabled/disabled identification 731, a button panel identification 733, and a next panel record pointer 735. Panel identifier 723 is a unique identifier for the panel corresponding to panel record 720. User identifier 725 is a unique identifier of the conferencing participant corresponding to the panel record 720. In one implementation, the user identifier 725 is the same identifier used by GCC services 443 to identify the conferencing participant. This user identifier 725 can be used by attendee bar services 446 to obtain the name and bit map image corresponding to the participant.

Indicator array pointer 727 is a pointer to an array of indicators corresponding to the panel, as discussed in more detail below. Number of indicators 729 indicates the number of elements in the array pointed to by indicator array pointer 727. Panel enabled/disabled identification 731 indicates whether the panel is disabled or enabled. Button panel identification 733 indicates whether the panel is a button which becomes the attendee bar menu when selected. Next panel pointer 735 is a pointer to the next panel record in the list of panel records associated with the attendee bar record 702 (or NULL if there are no more panel records).

Indicator array pointer 727 is a pointer to an array of indicator records corresponding to the panel. One such indicator record is shown as indicator record 740 of FIG. 7. Indicator record 740 includes an indicator identifier 743, a bit map identifier 745, an indicator type 747, and an indicator state 749. Indicator identifier 743 is an identifier of this indicator record for this panel. This identifier is unique within the panel, however, other panels can use the same identifier to identify their associated indicator records.

Bit map identifier 745 is an indicator of a registered bit map. In one embodiment, attendee bar services 446 maintains an indicator bit map database storing bit maps for all of the commands which can be accessed via an indicator in an attendee bar. Each registered bit map includes an identifier which uniquely identifies the bit map. Multiple panels from the same or different attendee bars can then use the same identifier (storing it as bit map identifier 745) for the bit map but only requiring the actual bit map to be stored once rather than for each indicator record. Indicator type 747 identifies the type of indicator that corresponds to indicator record 740 (e.g., static, button, togglebutton, or number). Indicator state 749 identifies the state of the indicator corresponding to indicator record 740.

In one embodiment, the attendee bar services of the present invention are provided through a series of function calls. A summary of these function calls follows.

ABarAddIndicator Adds an indicator to a panel. The panel is indicated by the calling application including an identifier of the panel.

ABarAddPanel Adds a panel to the attendee bar.

ABarAppendMenuItem Adds a menu item to all of the menus contained within the attendee bar. The menu item is provided by the calling application.

ABarCreate Creates an attendee bar. The calling application includes an identifier to the parent window in which the attendee bar is being created. The calling application includes an indication of the type of attendee bar being created (e.g., a list, room or gallery attendee bar). In one embodiment, the calling application also includes a maximum size of the attendee bar. ABarCreate returns an identifier of the newly created attendee bar.

ABarDeleteAllPanels Deletes all panels and frees all the panel memory associated with the given attendee bar window.

ABarDeleteAllMenuItems Deletes all menu items added with the ABarAppendMenuItem to the given attendee bar and frees all the memory associated with the memory items.

ABarDeleteIndicator Removes an indicator from the panel with the identifier provided by the calling application and frees all memory associated with the indicator.

ABarDeleteMenuItem Deletes the menu item with the given identifier and frees all memory associated with the item.

ABarDeletePanel Deletes the panel with the given identifier and frees all memory associated with the panel.

ABarEnablePanel Enables or disables a panel specified by the calling application. In one embodiment, enabling a panel does not automatically enable all indicators within the panel.

ABarGetID Retrieves the unique panel identifier of the panel at a particular position in the attendee bar.

ABarGetIDFromGCCId Retrieves the unique panel identifier of the panel associated with the given GCC user identifier.

ABarGetindicatorState Retrieves the current state of an indicator.

ABarGetMinSize Returns the minimum rectangle to which the given attendee bar can be resized. In one implementation, the minimum height and width of the attendee bar rectangle is based on having sufficient area for one line of text (which will vary based on font size), a border around the attendee bar, and a scroll bar.

ABarGetMinSizeFlags Returns the minimum rectangle to which an attendee bar with the given view flags may be resized.

ABarGetPosition Retrieves the position of the panel having the panel identifier provided by the application.

ABarGetText Retrieves the text of a panel which, in one embodiment, is the name of the conference participant corresponding to the panel. In one implementation, the text of the specified panel is copied into a buffer identified by the calling application.

ABarGetType Retrieves the current view flags for a given window.

ABarLastHit Indicates the last panel for which an indicator was pressed/activated by a user. When an indicator is activated, a message is sent to the parent window of the attendee bar. The parent window can then identify in which panel the activation was made using ABarLastHit.

ABarPanelCount Returns the total number of panels associated with the specified attendee bar window.

ABarRegisterIndicator Registers a given bit map and given indicator name with the indicator bit map database. The indicator bit map database maintains copies of all the possible bit maps that may be displayed as an indicator.

ABarResize Resizes the attendee bar. In one implementation, this resizing is done in response to a change in available space in the parent window (e.g., the parent window is resized). An input rectangle indicates the maximum size for the resized attendee bar.

ABarSetIndicatorState Sets or changes the state of a given indicator.

ABarSetPanels Adds an array of panels to the attendee bar window.

ABarSetText Sets the text attribute for a given panel. Can be used to initially set the text of a panel or to change text previously set. In one embodiment, the text of a panel is the corresponding conference participant's name.

ABarSetType Sets the view flags of the specified attendee bar window.

ABarShowPanel Attempts to bring the specified panel within the scroll window of the attendee bar. In one embodiment, if specified panel was to the right of the scroll window before the function call, it will become the rightmost panel visible within the scroll window. In this embodiment, if the given panel was to the left of the scroll window, it will become the leftmost visible panel within the scroll window, and if the panel is already within the scroll window then the panel is not moved.

ABarUpdate Causes the attendee bar to refresh its information about a given user from the conference manager. In one embodiment, the attendee bar retrieves a new user name and gallery bit map from the conference manager upon receipt of the call.

In one embodiment, these function calls are implemented as a series of software routines executed on one or more processors of a computer system (such as processors 302–303 of FIG. 3). Initially, these software routines may be stored in a storage device (such as mass storage device 325 of FIG. 3). When the conference manager is invoked, the instructions are copied from the storage device into memory (such as RAM 321) and then accessed and executed by processor 302 and/or processor 303. In one implementation these software routines are written in the C++ programming language. However, it is to be appreciated that these routines may be implemented in any of a wide variety of programming languages. Alternatively, the present invention can be implemented in discrete hardware or firmware.

In the descriptions above, reference is made to different data structures such as arrays and linked lists for storing information. These data structures, however, are only examples of implementing an attendee bar(s) of the present invention. It is to be appreciated that any of a wide variety of conventional data structures can be used within the spirit and scope of the present invention.

Also in the descriptions above, reference is made to various graphical images being stored as bit maps. The use of bit maps is only an example of implementing an attendee bar(s) of the present invention. It is to be appreciated that any of a wide variety of conventional graphical image storage devices can be used within the spirit and scope of the present invention.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

Thus, a method and apparatus for associating user information with conference participants in a conferencing environment has been described.

What is claimed is:

1. A method for dynamically associating information with a plurality of conferencing participants, the method including:

generating an attendee bar corresponding to a conference;

creating a plurality of panels within the attendee bar corresponding to the plurality of conferencing participants;

selecting information regarding one of the plurality of conferencing participants to include in each panel of the plurality of panels; and dynamically updating the attendee bar when the selected information regarding one of the plurality of conferencing participants changes while the participant is participating in the conference.

2. The method of claim 1, further comprising modifying the plurality of panels when one or more of the plurality of conferencing participants joins the conference.

3. The method of claim 1, wherein one or more panels of the plurality of panels includes a command identifier corresponding to an executable program.

4. The method of claim 3, further comprising:

executing the executable program responsive to the command identifier being activated.

5. The method of claim 1, further comprising displaying the selected information from a first panel of the plurality of panels responsive to the first panel being selected.

6. The method of claim 1, further comprising:

providing a first subset of the selected information in a menu; and providing a second subset of the selected information as indicators.

7. The method of claim 1, wherein the creating comprises creating the plurality of panels with a one-to-one correspondence of conferencing participants to panels.

8. A method for dynamically associating information with a plurality of conferencing participants, the method including:

generating an attendee bar database;

registering a plurality of panels with the attendee bar database, the panels corresponding to the plurality of conferencing participants;

selecting information regarding one of the plurality of conferencing participants to include in each panel of the plurality of panels; and dynamically updating one or more of the plurality of panels when the selected information regarding one of the plurality of conferencing participants changes, while the participant is participating in the conference.

9. The method of claim 8, further comprising:

associating a first set of the selected information with a plurality of indicators corresponding to the plurality of panels; and associating a second set of the selected information with a plurality of menu items corresponding to the plurality of panels.

10. The method of claim 8, further comprising providing a subset of the selected information regarding a conferencing participant when a panel of the plurality of panels corresponding to the conferencing participant is selected.

11. The method of claim 8, wherein the registering comprises registering the plurality of panels with a one-to-one correspondence of conferencing participants to panels.

12. An apparatus for dynamically associating information with a plurality of conferencing participants, the apparatus comprising:

a memory device to store a plurality of panels corresponding to the plurality of conferencing participants; and a processor to generate the plurality of panels, to register the plurality of panels with an attendee bar database, to select information regarding one of the plurality of conferencing participants to include in each panel of the plurality of panels, to associate at least a subset of the plurality of panels with an attendee bar, and to dynamically update the attendee bar when the selected information regarding one of the plurality of conferencing participants changes, while the participant is participating in the conference.

13. The apparatus of claim 12, wherein the memory device is also to store the attendee bar database.

14. An apparatus for dynamically associating information with a plurality of conferencing participants, the apparatus comprising:

means for generating an attendee bar corresponding to a conference;

means for creating a plurality of panels within the attendee bar corresponding to the plurality of conferencing participants;

means for selecting information regarding one of the plurality of conferencing participants to include in each panel of the plurality of panels; and means for dynamically updating the attendee bar when the selected information regarding one of the plurality of conferencing participants changes, while the conferencing participant is participating in the conference.

15. The apparatus of claim 14, further comprising means for modifying the plurality of panels when one or more of the plurality of conferencing participants joins the conference.

16. The apparatus of claim 14, wherein one or more panels of the plurality of panels includes a command identifier corresponding to an executable program.

17. The apparatus of claim 14, further comprising means for displaying the selected information from a first panel of the plurality of panels responsive to the first panel being selected.

18. The apparatus of claim 14, further comprising:

means for providing a first subset of the selected information in a menu; and means for providing a second subset of the selected information as indicators.

19. A method for dynamically associating information with a plurality of conferencing participants, the method including:

generating a plurality of attendee bars, each attendee bar corresponding to a conference;

creating a plurality of panels within each attendee bar corresponding to the plurality of conferencing participants;

selecting information regarding one of the plurality of conferencing participants to include in each panel of the plurality of panels; and dynamically updating the attendee bar when the selected information regarding one of the plurality of conferencing participants changes, while the participant is participating in the conference.

* * * * *